United States Patent [19]

Sugiki et al.

[11] Patent Number: 4,885,647
[45] Date of Patent: Dec. 5, 1989

[54] APPARATUS FOR REPRODUCING A DIGITAL SIGNAL

[75] Inventors: Hiraku Sugiki, Saitama; Hiroyuki Ino; Tadashi Fukami, both of Kanagawa, all of Japan

[73] Assignee: Sony Corporation, Tokyo, Japan

[21] Appl. No.: 145,095

[22] Filed: Jan. 19, 1988

[30] Foreign Application Priority Data

Jan. 28, 1987 [JP] Japan .................................. 62-17970

[51] Int. Cl.⁴ ...................................... G11B 15/52
[52] U.S. Cl. ............................. 360/73.12; 360/73.04
[58] Field of Search ............... 360/73.11, 73.12, 73.13, 360/73.09, 73.03, 73.04

[56] References Cited

U.S. PATENT DOCUMENTS

| | | | |
|---|---|---|---|
| 4,131,912 | 12/1978 | Hirai | 358/4 |
| 4,189,758 | 2/1980 | Morio et al. | 360/77 |
| 4,386,300 | 5/1983 | Ogawa | 318/314 |
| 4,527,207 | 7/1985 | Owaki et al. | 360/73.12 |
| 4,538,096 | 8/1985 | Kern | 318/314 |
| 4,543,516 | 9/1985 | Kobori | 318/318 |
| 4,620,238 | 10/1986 | Gaskell | 360/8 |
| 4,630,142 | 12/1986 | Tani et al. | 360/73.12 |
| 4,639,649 | 1/1987 | Seto | 318/314 |

Primary Examiner—John H. Wolff
Assistant Examiner—Matthew J. Bussan
Attorney, Agent, or Firm—Philip M. Shaw, Jr.

[57] ABSTRACT

A rotary head apparatus of the type which reproduces digital signals recorded in one or more oblique tracks on a recording medium, the digital signals being formatted such that one frame of the digital signals is formed of n blocks, each block having added to it a block address and a frame address, wherein the apparatus compares the frame address from the reproduced signal with a reference frame address which varies with a reference period, and the transporting speed of the recording medium is then controlled so as to make the difference between the reproduced frame address and the reference frame address constant.

5 Claims, 8 Drawing Sheets

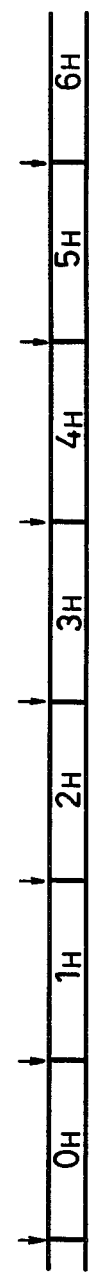
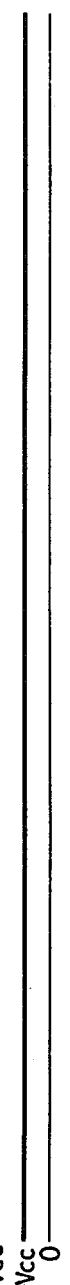
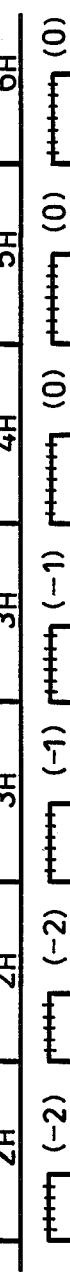

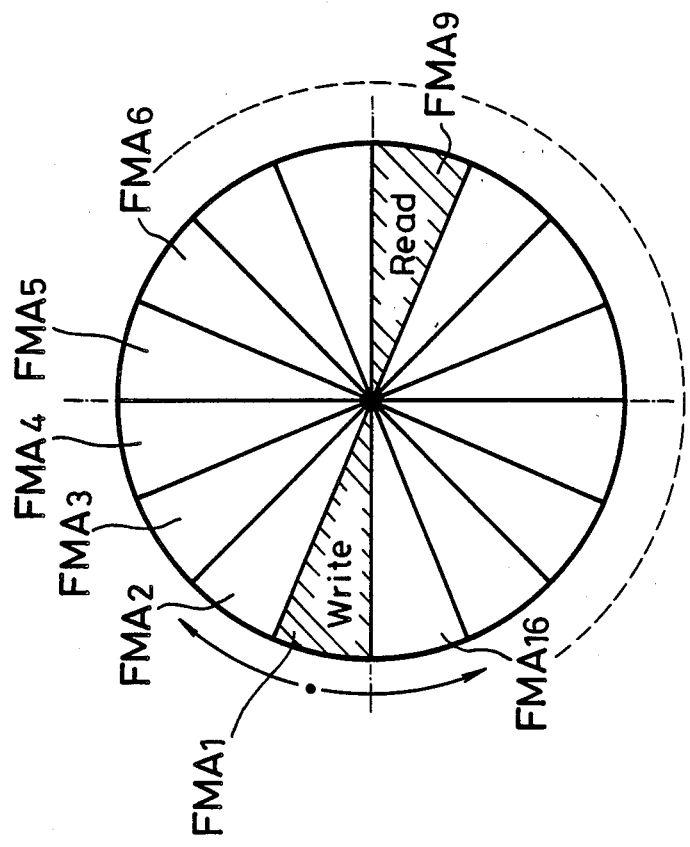

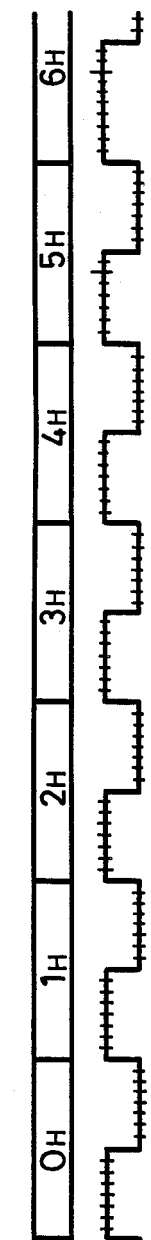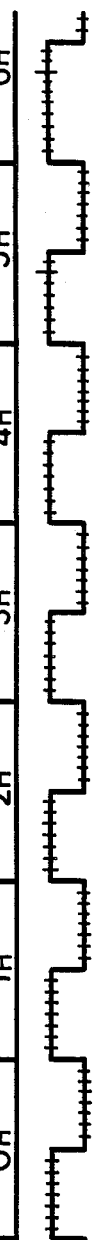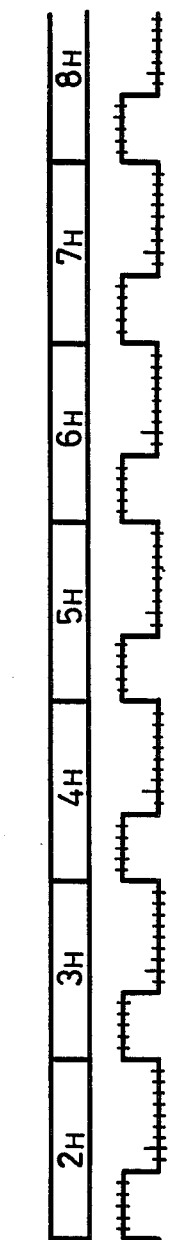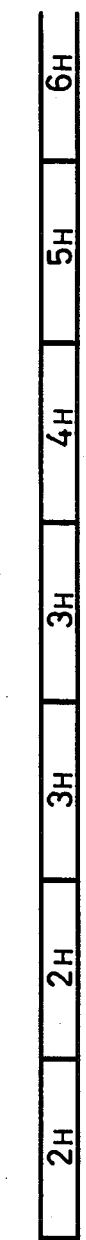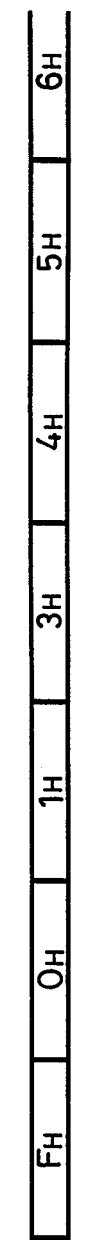
FIG. 8-1 Reproduced Wave Form
FIG. 8-2 Reference Frame Address
FIG. 8-3 Reference Signal
FIG. 8-4 Reproduced Frame Address
FIG. 8-5 CM₁
FIG. 8-6 Reproduced Frame Address
FIG. 8-7 CM₁
FIG. 8-8 CM₂
FIG. 8-9 Reproduced Frame Address
FIG. 8-10 CM₁
FIG. 8-11 CM₂

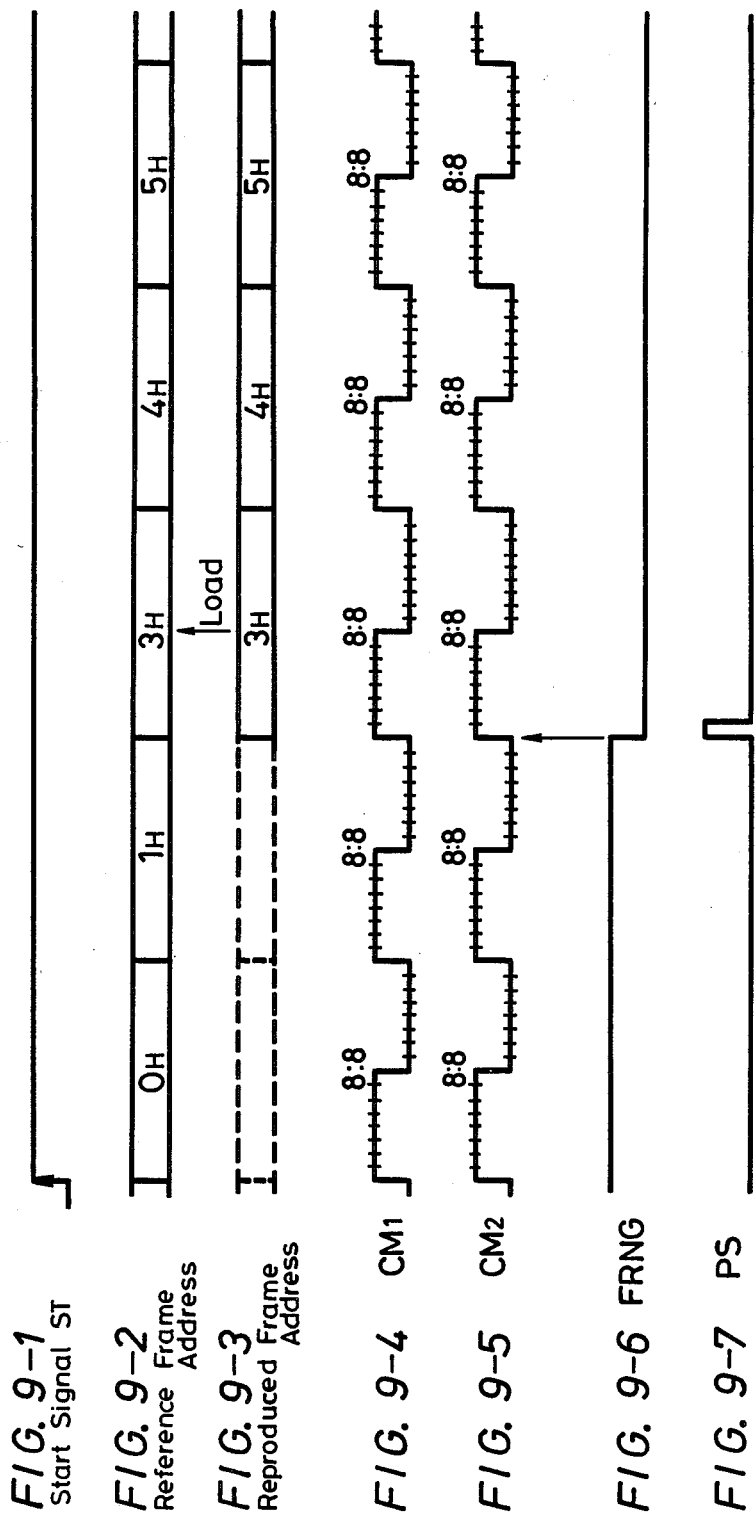

APPARATUS FOR REPRODUCING A DIGITAL SIGNAL

BACKGROUND OF THE INVENTION

1. Field of the Invention

This invention relates generally to an apparatus for reproducing digital signals, and more particularly an apparatus of this kind which is suitable for use in reproducing digital signals recorded on a tape by rotary heads.

2. Description of the Prior Art

There have been proposed various apparatus for recording and/or reproducing PCM coded audio and video signals in and from oblique tracks formed on a tape by rotary heads.

In general, such rotary head equipped recording and/or reproducing apparatus are provided with a tracking servo so that the rotary heads correctly scan the recorded tracks. In the above-mentioned apparatus for recording and/or reproducing PCM coded signals, the tracking servo uses a control signal recorded, for example, on an end portion of the tape in its width direction and a pilot signal recorded in tracks for recording PCM-coded signals by frequency division or area division. For example, the tracking servo using the pilot signal is used in the recording and reproducing circuit for 8 mm video tape recorders and digital tape recorders equipped with rotary heads (hereinafter simply referred to as "R-DAT").

However, in using the tracking servo it is necessary to adjust with high accuracy the position of the head in its so-called head height direction, i.e. perpendicular to the rotating direction of the rotary heads, and also an angular distance between the heads, that is, a so-called angular division ratio in the case of apparatus equipped with two heads, thereby requiring an extremely expensive drum on which the rotary heads are mounted.

Particularly in the case of the format for the R-DAT, the location of areas in which the pilot signals for the tracking servo are recorded is complicated and accordingly high accuracy is required therefor.

Further, in a conventional apparatus the drum and the capstan have to be servo-controlled independently of each other so that they cannot be driven by the same motor, resulting in a higher production cost thereof.

By way of background, the PCM signal is recorded in the following manner:

A plurality of blocks of PCM signals form one frame. A block address and an address of the frame to which the block belongs are added to the blocks. Next, each frame unit is interleaved and then an error correcting code and so on are added to the interleaved frames. Finally, each of the frames is recorded in one or two oblique tracks formed on a tape.

The PCM signal thus recorded is reproduced in a manner such that the block data having the same frame address is sequentially written into a buffer RAM for processing PCM signals for reproduction in accordance with the block addresses, subjected to processing such as deinterleaving, error correction and so on, and then reproduced.

It can be noted that if several frame portions of a PCM signal can be written into the buffer RAM, the PCM signal can be reproduced without high tracking accuracy.

Thus, there has been proposed a so-called non-tracking servo system which does not rely on a tracking servo of the type which uses a control signal and a pilot signal as mentioned above. Such a system is disclosed in, for example, copending U.S. patent application Ser. No. 087,093, filed Aug. 19, 1987.

In this case, however, the tape transporting speed upon recording may not be equal to that upon reproducing due to differences in various conditions. If no correction is made, data recorded in the same track will be reproduced twice, the track will be jumped to reproduce data in the next track, or the like. Thus, it is required to reproduce the signals at the same tape speed as upon recording.

Japanese Laid-open Patent Application No. 61-39961 discloses an apparatus for controlling the tape transporting speed in response to the difference between a write address for writing a reproduced signal from a reproduced block address into an RAM and a read address for reading a written signal from the RAM.

However, according to the above-mentioned Japanese Laid-open Patent Application, the frame address, which varies corresponding to rotation of the rotary heads, is not recorded on the tape so that the tape transporting speed can not be controlled by the use of the frame address.

OBJECTS AND SUMMARY OF THE INVENTION

Accordingly, it is an object of the present invention to propose an improved apparatus for reproducing digital signals.

It is another object of the present invention to provide an apparatus for reproducing digital signals which does not employ a tracking servo.

It is a further object of the present invention to provide an apparatus for reproducing digital signals which is equipped with a tape transporting speed controller.

According to the present invention there is provided an apparatus for reproducing digital signals which have been recorded in one or more oblique tracks on a tape by means of rotary heads, wherein one frame of such digital signals is formed of a plurality of blocks of data and each of the data blocks includes a frame address which varies with every frame, the apparatus comprising:

(a) rotary heads for reproducing digital signals from the tape;

(b) means for transporting the tape relative to the rotary heads;

(c) deriving means for deriving the frame address from the digital signals reproduced by the rotary heads;

(d) generating means for generating a reference frame address which varies at a predetermined period;

(e) comparing means for comparing the derived frame address with the reference frame address and generating a control signal; and (f) control means for controlling the tape speed of the tape transporting means in response to the control signal.

These and other objects, features and advantages of the present invention will become apparent from the following detailed description of the preferred embodiment taken in conjunction with the accompanying drawings, throughout which like reference numerals designate like elements and parts.

BRIEF DESCRIPTION OF THE DRAWINGS

FIGS. 4A–4H, 5, 6-1, 6-2, 6-3A to C, 6-5A to C, 7, 8-1 to 11, 9-1 to 7 are timing charts used for explaining various operations of the embodiment shown in FIG. 3.

DESCRIPTION OF THE PREFERRED EMBODIMENT

Now, an embodiment of the present invention will hereinafter be described for the case where the present invention is applied to an R-DAT as an example, with reference to the accompanying drawings.

Reference is first made to the recorded data format for the R-DAT. As is commonly known to those skilled in the art, the R-DAT has two rotary heads angularly spaced with respect to each other by 180, having different gap azimuth angles with respect to each other, and which obliquely scan a tape and alternately form tracks to thereby record and reproduce PCM-coded audio signals on the tape. The tape is wrapped on the periphery of a guiding drum by a tape wrap angle of 90°.

The two tracks formed by the respective heads, that is, a plus-azimuth track and a minus-azimuth track, form one frame. One frame portion of PCM-coded data is divided into a plurality of blocks, in which a block address and a frame address are recorded. In the present embodiment, it is assumed that 128 blocks of PCM-coded data are recorded in one track.

Figure 1:
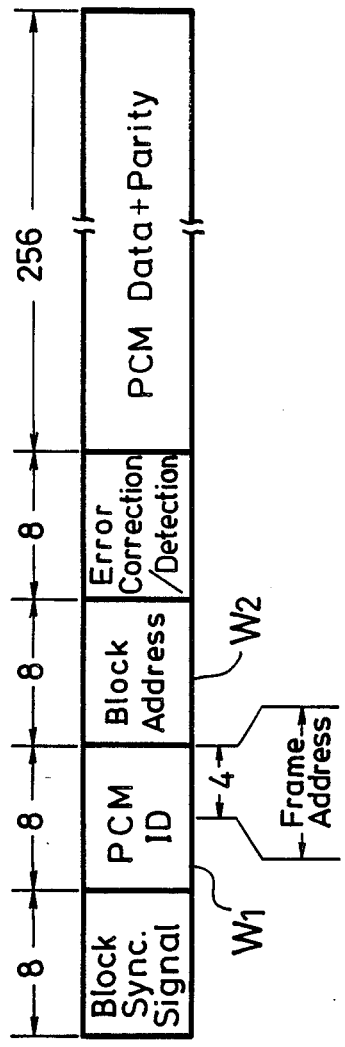
FIGS. 1 and 2 are diagrams used for explaining a recorded data format for an R-DAT.

The data block is formed of 288 bits, as shown in FIG. 1. The first 8-bits of data located at the top of the block is a block synchronizing signal, the next 8-bits of data $W_1$ located next to the top data block is a PCM identification signal (PCM-ID), the 8-bits of data $W_2$ located next to the data $W_1$ is the address of the block, the 8-bits of data located next to the block address is a parity for detecting or correcting errors which possibly occur in the PCM-ID and the block address, and the remaining 256 bits are the PCM data and their parity. In this arrangement, into the lower four bits of the PCM-ID at every other block, there is inserted the address of the frame to which the block belongs. Blocks belonging to the same frame have the same frame address.

Figure 2:
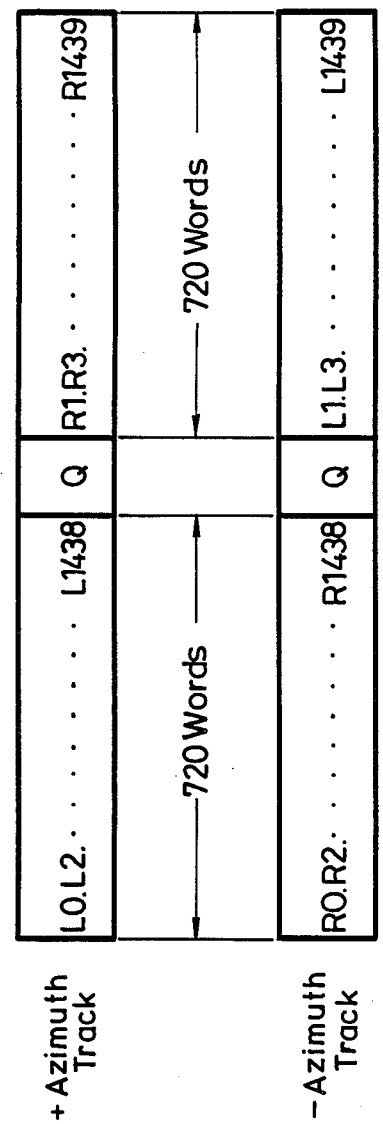

In this case, the PCM data interleave is completed by one frame, that is, two tracks formed of plus-azimuth and minus-azimuth tracks. As shown in FIG. 2, even-numbered data $L_0, L_2 \ldots L_{1438}$ or odd-numbered data $L_1, L_3 \ldots L_{1439}$ of the left channel and odd-numbered data $R_1, R_3 \ldots R_{1439}$ or even-numbered data $R_0, R_2, \ldots R_{1438}$ of the right channel are recorded respectively in the former and latter halves of one track. In other words, the data are recorded over two tracks so that even if one of the two heads is unable to reproduce signals, for example, due to clogging, the signal can be reproduced by correction or interpolation. Reference letter Q in FIG. 2 designates parity data.

The frame addresses are so added that they circulate with every 16 frames.

Areas for recording a pilot signal for the tracking servo are located in the top and end portions of each track. Generally, the tracking servo control is effected by the use of a reproduced pilot signal, however, such a tracking servo is not at all used in the present embodiment.

As described above, it is sufficient to write data into an RAM by the frame address and the block address to reproduce signals. Further, by virtue of the two track interleaving, even if one of the two heads cannot reproduce the data, the data can be reproduced by interpolation, so that a non-tracking servo type apparatus can reproduce signals satisfactorily.

Figure 3:
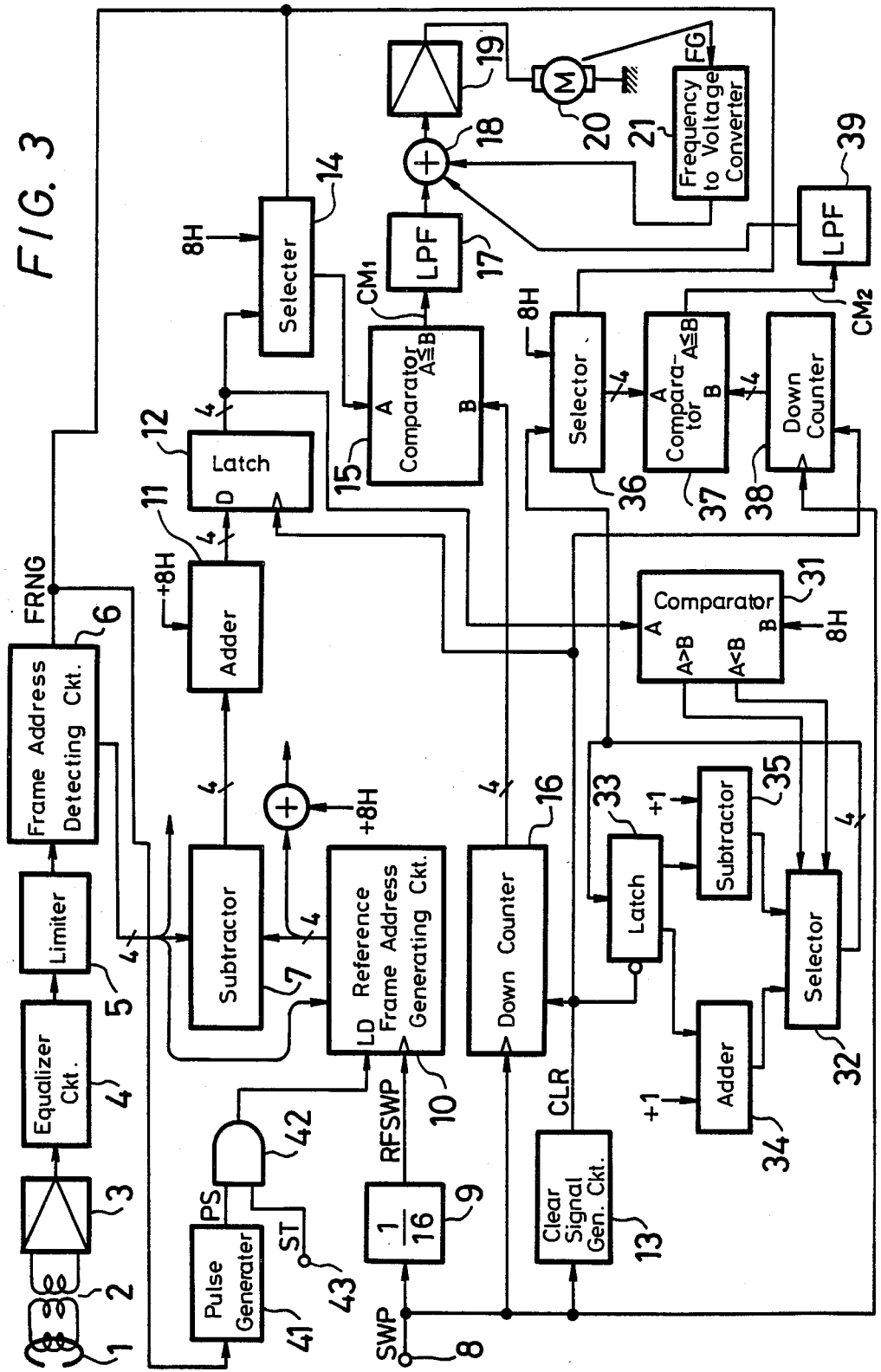
FIG. 3 is a circuit block diagram showing the whole arrangement of an embodiment of an apparatus for reproducing digital signals according to the present invention.

It is also required even for the non-tracking servo apparatus to make the tape transporting speed during reproduction equal to the tape speed during recording. FIG. 3 is a block diagram showing an example of a servo circuit for this purpose.

In FIG. 3, reference numeral 1 designates a rotary head which is assumed to represent two rotary heads for ease of explanation. The reproduced output from the rotary head 1 is supplied sequentially to a reproduced frame address detecting circuit 6 through a series connection of a rotary transformer 2, a reproducing amplifier 3, a reproducing equalizer circuit 4 and a limiter 5 in this order. The reproduced frame address detecting circuit 6 detects the frame address contained in the lower four bits of the PCM-ID at every other block and supplies the same to a subtractor circuit 7.

The reproduced frame address is also utilized as a writing frame address for writing into the RAM memory for reproduction processing, as will be described later.

A signal SWP having a frequency 16 times the frequency of a head change-over signal RFSWP is supplied through a terminal 8 to a frequency divider 9 to be divided by 16, thereby deriving a signal of one frame period. That is, the frame address is circulated by 16 frames and one period of the head change-over signal RFSWP corresponds to one frame. The signal of one frame period thus produced by the frequency divider 9 is supplied to a reference frame address generating circuit 10. The reference frame address generating circuit 10 is formed of a counter for handling four bit signals to sequentially count the signals of the frame period from the frequency divider 9. The counted value, that is, the reference frame address is supplied to the subtractor circuit 7. The reference frame address from the reference frame address generating circuit 10 is increased by "8" in hexadecimal to be also utilized as a reading frame address for reading data from the RAM for reproduction signal processing, as will be described later.

Assuming that the tape transporting speed upon reproduction is the same as that upon recording, the reference frame address from the reference frame address generating circuit 10 is generated, such as 0H, 1H, 2H, EH, FH, 0H, IH ..., in hexadecimal form as shown in FIGS. 4A and 4B, at the same timing as the generation of the head change-over signal RFSWP. The tape speed control circuit arrangement of this example controls the tape speed so as to make the reference frame address coincide with the reproduced frame address when the tape is transported at a normal speed (refer to FIG. 4C). The subtractor circuit 7 measures how much the current tape transporting speed deviates from the normal tape transporting speed. The subtraction result (FIG. 4D) thus obtained is supplied to an adder circuit 11. The adder circuit 11 adds "8" in hexadecimal to the subtraction result and supplies its output to a latch circuit 12.

The signal SWP supplied to the terminal 8 is also supplied to a clear signal generating circuit 13 to generate a clear pulse signal CLR (FIG. 4G) for one frame period which is then supplied to the latch circuit 12 as a latch signal. The latched output therefrom is supplied through a selector circuit 14 to a comparator circuit 15.

The signal SWP (FIG. 4E) is also supplied to a down counter 16 which handles hexadecimal signals. The down counter 16 is reset or cleared at every frame address by the clear pulse signal CLR from the clear pulse generating circuit 13. Accordingly, the down counter 16 outputs the counted values in hexadecimal as shown in FIG. 4F which are supplied to the comparator circuit 15 as a 4-bit signal. The comparator circuit 15 outputs a signal $CM_1$ (FIG. 4H) which goes high in level when the output from the latch circuit 12 through selector 14 is smaller than the counted value of the down counter 16 and goes low in level when the output from the latch circuit 12 i larger than the counted value of the down counter 16. The output signal $CM_1$ from the comparator 15 is supplied through a series connection of a low pass filter 17, an adder circuit 18 and a motor drive circuit 19 to a capstan driving motor 20 for controlling the tape transporting speed.

A signal FG generated by a frequency generator (not shown) arranged coaxially with the capstan driving motor 20 is supplied to a frequency to voltage converting circuit 21 to derive a voltage output corresponding to the rotational speed of the motor 20. This voltage is fed back to the motor 20 through the adder circuit 18 and the motor drive circuit 19 to thereby servo-control the rotational speed of the motor 20.

By the circuit arrangement described above, the tape transporting speed is controlled by controlling the motor 20 as follows:

The subtractor circuit 7 detects the deviation of the tape transporting speed from the normal tape transporting speed by detecting the difference between frame addresses. In this case, the frame address difference is divided by 16, wherein "0" designates the case where there is no difference between the frame addresses, with a scale from −1 to −8 in the direction of delay and from +1 to +7 in the direction of advancement. A signal corresponding to the frame address difference is PWM-coded and then supplied to the capstan driving motor 20 for controlling the same. To be more specific, the PWM-coded output is duty-controlled such that if the frame address difference is zero, the ratio of the high level period to the low level period of the PWM-coded signal is set to 8:8, if the difference is +1, the ratio is set to 7:9, and if the difference is −1, the ratio is set to 9:7. The addition of "8" in hexadecimal by the adder circuit 11 is in preparation for the above-mentioned duty control operation. The PWM-coding is processed by the latch circuit 12, the comparator circuit 15 and the down counter 16. Specifically, when the output from the down counter 16 is larger than the output from the latch circuit 12, the comparator circuit 15 outputs the control signal $CM_1$ at the high level as shown in FIG. 4H. When the output from the latch circuit 12 becomes larger than the output from the down counter 16, the comparator circuit 15 outputs the control signal CMl at the low level to thereby derive the PWM-coded signal.

Figure 5:
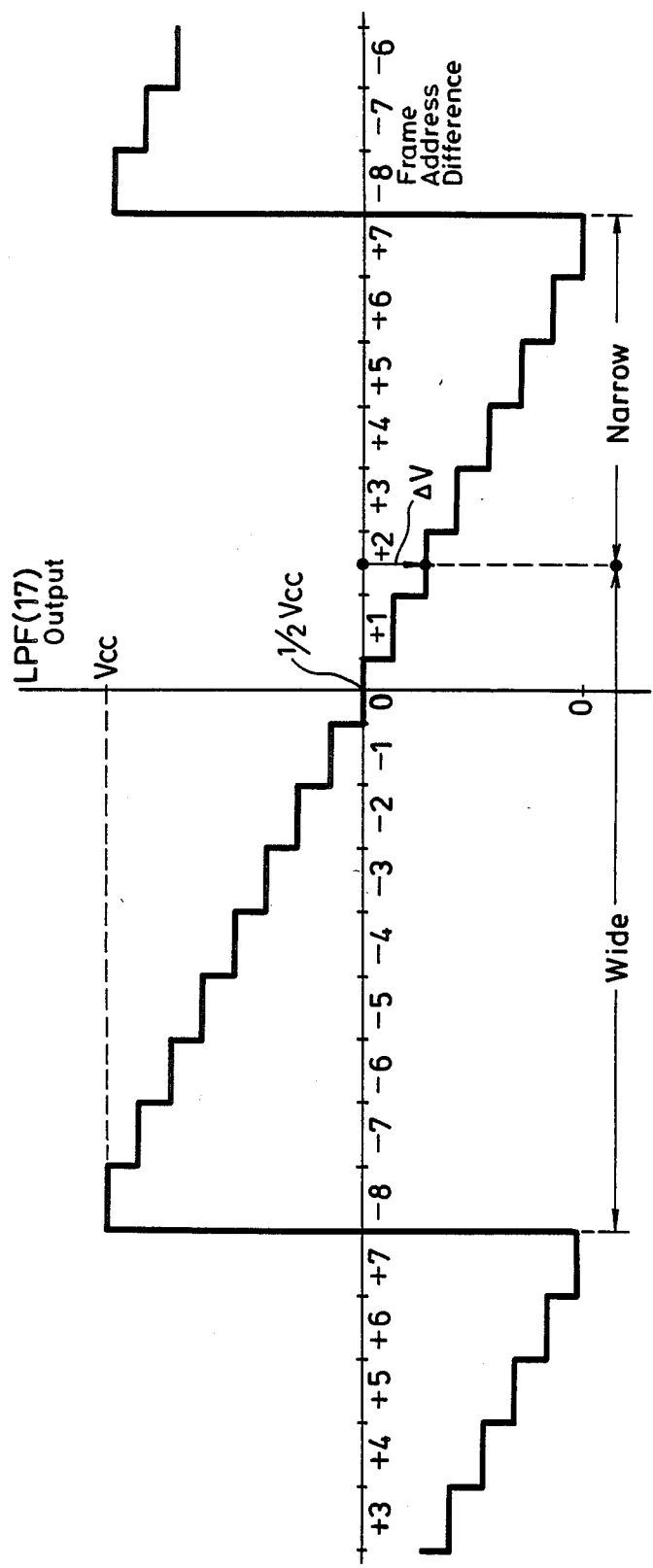

The relationship between the frame address difference and the PWM-coded signal (the output from the low pass filter 17) is shown in FIG. 5.

The operations described above will now be explained with reference to timing charts shown in FIGS. 6-1 to 6-5. FIG. 6-1 indicates output signals reproduced by the two heads, wherein reference letter A designates an output signal reproduced by one of the two heads, and B an output signal reproduced by the other head which is angularly spaced by 180° from the former and has a different azimuth angle. If the tape transporting speed upon reproduction is made equal to that upon recording by the speed servo control, the reference frame address generated by the reference frame address generating circuit 10 is coincident in timing with the output of the reproduced signal as shown in FIG. 6-2.

Assuming that the tape is in a normal phase, the reproduced frame address is expressed in hexadecimal, as shown in FIG. 6-3A. In this case, the control signal $CM_1$ from the comparator circuit 15 is, as shown in FIG. 6-3B, a signal of one frame period with a duty ratio of 50%, that is, the ratio of the high level period to the low level period is 8:8. The output from the low pass filter 17 is, as shown in FIG. 6-3C, a voltage Vcc/2, where Vcc represents the power supply voltage.

Reference is next made to the case where the tape transporting speed is excessively high so that it should be corrected to be lower, which is represented by FIGS. 6-4A, 4B and 4C. It is assumed, for example, that the reproduced frame address is advanced by 2 frame addresses ahead of the reference frame address 0H, as shown in FIG. 6-4A. In this case, the control signal $CM_1$ from the comparator circuit 15 is a signal with a duty ratio of 6:10 corresponding to a frame address difference of −2 in order to decrease the tape transporting speed with respect to a frame address difference of +2.

When the difference between the reproduced frame address and the reference frame address is decreased to be one frame address by the control signal $CM_1$ at that time, the control signal $CM_1$ or the PWM-coded signal PWM with a duty ratio of 7:9 corresponding to a difference of −1 is derived from the comparator circuit 15. Then, the tape transporting speed is controlled so that the control signal $CM_1$ becomes a PWM-coded signal with a duty ratio of 8:8 corresponding to the coincidence of the reproduced frame address and the reference frame address. The output from the low pass filter 17 is, as shown in FIG. 6-4C, a voltage signal that is lower than Vcc/2 when the tape transporting speed is excessively high and gradually increased to Vcc/2.

Next, reference is made to the case where the tape transporting speed is excessively low so that it should be corrected to be higher, which is represented by FIGS. 6-5A, 6-5B and 6-5C. It is assumed, for example, that the reproduced frame address is such that the head is positioned, as before, by two frames ahead of the reference frame address. In this case, the control signal $CM_1$ from the comparator circuit 15 becomes a PWM-coded signal corresponding to a frame address difference of +3. Then, as the frame address difference is decreased gradually, the control signal $CM_1$ is gradually changed to PWM-coded signals corresponding to smaller differences. Finally, the tape transporting speed is regulated and accordingly the control signal $CM_1$ is set to a PWM-coded signal corresponding to the coincidence of the reproduced frame address and the reference frame address. The output from the low pass filter 17 is gradually decreased from a voltage signal that is higher than Vcc/2 to Vcc/2, and remains at Vcc/2 after the tape transporting speed is regulated.

When the tape transporting speed is excessively high, the duty ratio of the control signal CMI from the comparator circuit 15 is changed from 6:10 to 7:9 and finally to 8:8. When the output from the low pass filter 17 is lower than Vcc/2, the servo is used to decrease the rotational speed of the motor to the normal speed.

On the other hand, when the tape transporting speed is excessively low, the duty ratio of the control signal $CM_1$ from the comparator circuit 15 is changed from, for example, 11:5 through 10:6 to 8:8. The output from the low pass filter 17 is higher than Vcc/2, the servo operates to increase the rotational speed of the motor, so that the motor is accelerated in rotation to become the regulated speed.

The tape transporting speed is controlled as described above, so that it becomes the normal speed when the signal indicative of the frame address difference outputted from the subtractor circuit 7 shows zero. The control signal $CM_1$ from the comparator circuit 15 is arranged so that the dynamic range of the servo becomes widest when the frame address difference becomes zero. However, in practice an offset occurs due to loads such as a cassette and so on, thereby causing a condition in which the servo is not locked at the time the frame address difference becomes zero as the regular point but at the time the difference is offset, for example, by two frames.

As is apparent from FIG. 5, if the servo is locked with at a difference of, for example, +2 frame addresses, the dynamic range in the plus direction of the frame address difference is reduced, and accordingly the whole dynamic range is also restricted thereby.

The reproduced frame address is also utilized as the write address for writing data into the buffer RAM for reproduction processing, and the reference frame address as the read address for reading data from the buffer RAM, respectively, as mentioned above.

To be specific, the RAM for reproduction processing has 16 frame memory areas FMA1–FMA16 so as to store 16 frame portions of data therein, as shown in FIG. 7. One of the 16 frame memory areas is specified by the frame address. In this example, writing reproduced data into the RAM and processes such as reading the written reproduced data from the RAM, error correction and decoding thereof or the like are carried out in parallel, thereby efficiently operating the memory and reducing the time required for the decoding process during reproduction. This technique, however, does not directly relate to the present invention so that a detailed explanation thereof will be omitted (refer to U.S. patent application Ser. No. 019,583, filed Feb. 27, 1987).

For carrying out the writing and reading in parallel, as mentioned above, by locating the frame memory areas for writing and for reading most remotely from each other, these areas for the writing and reading will never be superimposed on each other even if the write address and/or read address is varied due to some reason. It is therefore possible to accomplish the reading and writing operations easily and without difficulty. In other words, the margin of the memory becomes large.

Assuming that the servo is always locked at the time the frame address difference is zero, that is, without any offset, the above object can be achieved, for example, by adding the fixed value "8H" ("8" in hexadecimal) to the reference frame address, as shown in FIG. 3. However, the presence of such an offset as described above reduces the margin of the memory. If the offset is constant, it is possible to cope with the offset by adding a fixed value to the reference frame address. However, the offset varies in dependence on the amount of the load or the like so that the mere addition of a fixed value cannot completely follow the varying offset value.

Thus, the embodiment of the apparatus according to the invention shown in FIG. 3 is operative to remove the offset and positively lock the servo at the time the signal indicative of the frame address difference outputted from the subtractor circuit 7 shows zero.

This event will now be explained in detail, referring again to FIG. 3. The output from the latch circuit 12 is supplied to one input terminal of a comparator circuit 31. The other input terminal of the comparator circuit 31 is fed with a value "8H" in hexadecimal. Therefore, the comparator circuit 31 measures how far the signal indicative of the frame address difference outputted from the latch circuit 12 is offset from zero. Then, the output from the comparator circuit 31 is supplied to a selector 32 as a selection signal. The output from the selector 32 is supplied to a latch circuit 33. The output from the latch circuit 33 is supplied to an adder circuit 34 wherein +1 is added thereto. The added output from the adder circuit 34 is supplied to an input terminal of the selector 32. The output from the latch circuit 34 is also supplied to a subtractor circuit 35 to be decremented or subtracted by one. The output from the subtractor circuit 35 is supplied to the other input terminal of the selector 32. The latch circuit 33 operates when it receives the pulse CLR from the clear signal generating circuit 13. The selector 32 is operative to select the output from the adder circuit 34 when the comparator circuit 31 detects that the output from the latch circuit 12 is larger than "8H" and the output from the subtractor circuit 35 when the comparator circuit 31 detects that the output from the latch circuit 12 is smaller than "8H". The output from the selector 32 is supplied to a comparator circuit 37 through a selector 36. The comparator circuit 37 is also supplied with a signal from a down counter 38 which handles 4-bit signals, similar to the down counter 16. The down counter 38 is supplied with the signal SWP at its clock terminal and reset at every frame by the clear pulse CLR in the same manner as the down counter 16. Therefore, the comparator circuit 37 derives a signal $CM_2$ that is PCM-coded corresponding to the output value of the selector 32 and supplies the same to the motor 20 by way of a low pass filter 39, the adder circuit 18 and the drive amplifier 19, in the same manner as the output from the aforementioned comparator circuit 15.

By the circuit arrangement as described above, even if the speed control servo is locked in a condition that the output from the subtractor circuit 7 contains an offset, the offset is compensated for by the output $CM_2$ from the comparator circuit 37, so that the offset can be removed from the output from the subtractor circuit 7, that is, the output $CM_1$ from the comparator circuit 15.

Figure 4:
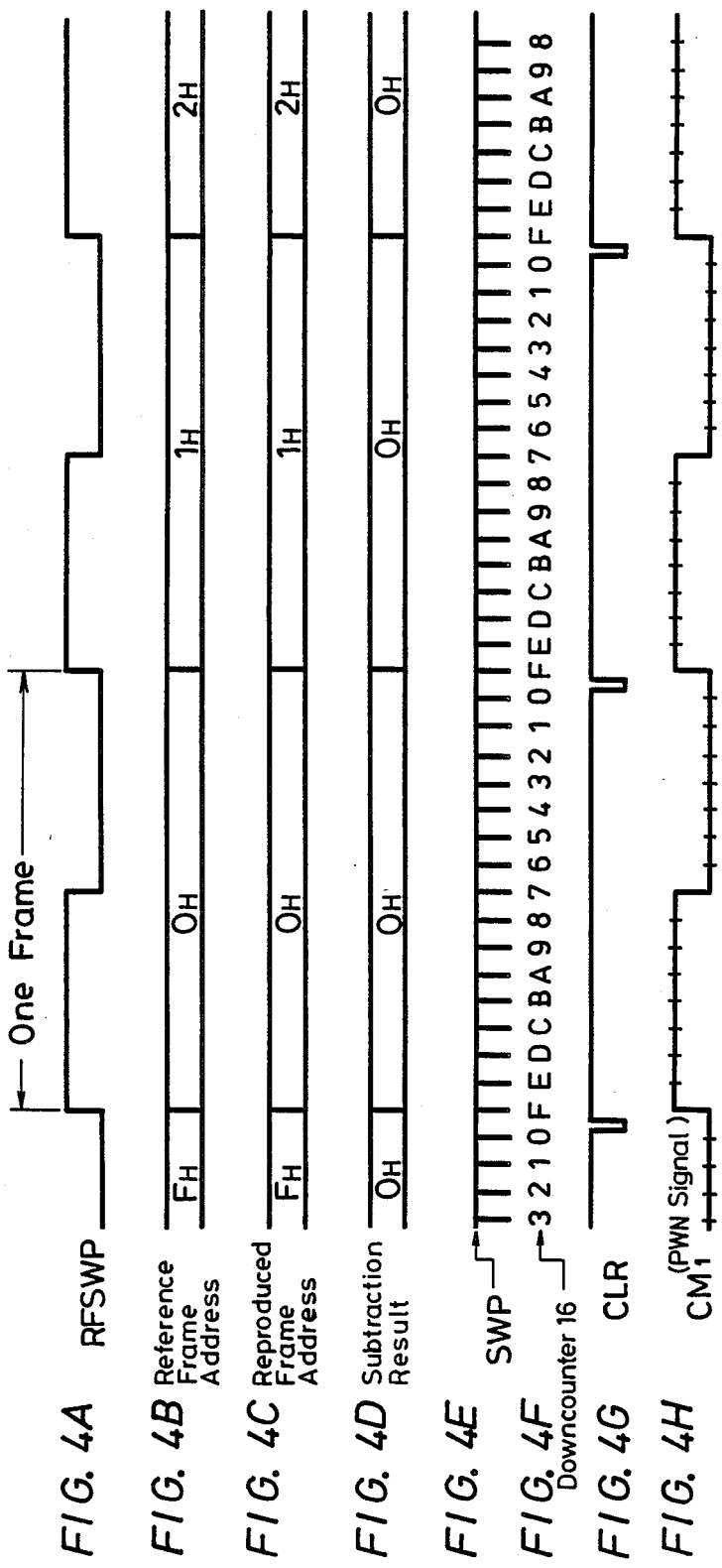

The above-mentioned operation will now be explained in detail with reference to FIGS. 8-1 to 8-11. FIG. 8-1 indicates output signals reproduced by the two heads, and FIG. 8-2 the reference frame addresses. If the control signal $CM_1$ from the comparator circuit 15 does not contain any offset, it should be a signal with a duty ratio of 50%, that is, having its high level period and low level period in the ratio of 8:8, as shown in FIG. 8-3. However, if the servo is locked in a condition that the reproduced frame address is offset by two frame addresses from the reference address as shown in FIG. 8-4, the duty ratio of the control signal $CM_1$ becomes 6:10 as shown in FIG. 8-5.

If the reproduced frame address is offset in the plus direction as shown in FIG. 8-6, the circuits 31 to 39 operate so as to remove the offset contained in the control signal $CM_1$ from the comparator circuit 15 as shown in FIG. 8—8. Specifically, assume that the output $CM_2$ from the comparator circuit 37 has a duty ratio of 50% or 8:8 as shown in FIG. 8—8 when the control signal $CM_1$ from the comparator circuit 15 is a PWM signal corresponding to a frame address difference of +2. Then, the selector 32 is changed over to select the output from the adder circuit 34 at the next frame address so that the output signal $CM_2$ from the comparator circuit 37 gradually deviates in the plus direction as shown in FIG. 8—8. Subsequently, the output $CM_1$ from the comparator circuit 15 gradually deviates in the minus direction corresponding to the amount of the deviation in the plus direction of the output $CM_2$ from the comparator circuit 37 until the duty ratio of the output $CM_1$ becomes 50% or 8:8. In other words, the offset contained in the signal $CM_1$ is compensated for by the output signal $CM_2$ of the comparator circuit 37. Similarly, if the signal $CM_1$ is offset in the minus direction, the control signal $CM_2$ gradually deviates in the minus direction, as shown in FIGS. 8-9 to 8-11, to thereby compensate for the minus offset of the signal $CM_1$.

By the use of the output $CM_2$ of the comparator circuit 37 for compensating for the offset of the signal $CM_1$, the dynamic range for the tape transporting speed control can be extended or widened. That is, since the offset is compensated for by a control system other than the main tape transporting speed control system, the main control system itself always operates without any offset so that the frame address difference is zero, whereby a wide dynamic range is available.

Further, serving is always effected without using the frame address difference so that the difference between the reading frame address and the writing frame address can be always fixed at "8H" and thereby signals are processed with the highest margin. Even though fluctuations occur due to servo errors, the signal processing can be stably carried out.

The above description is given for servoing in the normal condition. However, the servo control system may fall into a hold condition, for example, at a start or in case where the frame address cannot be reproduced from a certain time point, wherein the control signal $CM_1$ from the comparator circuit 15 indicates an incorrect value. When such a hold condition appears, if the motor is used in common as the capstan motor and the drum motor for the rotary heads, the rotational speed of the drum deviates greatly from the normal speed. Then, the relative speed of the rotary heads to the tape also deviates from the normal speed. Consequently, the phase lock loop (PLL) for generating a clock for establishing the bit synchronization in the reproducing system becomes out of the lock range and thereby the frame address cannot be reproduced even though the recorded area of PCM data is reproduced by the heads. Accordingly, control of the tape transporting speed is rendered impossible. The above embodiment of the present invention is arranged so as to suppress or remove the above-mentioned defect as will shortly be explained.

As mentioned above, the servo circuit is operative to process reproduced signals in a manner such that the write address and the read address are allocated for the RAM for the reproduction processing so as to produce the largest margin. However, it is unknown which RAM area the reproduced frame address will designate at the start, which is a disadvantage for the tape transporting speed control. This is also taken into account by the embodiment of the present invention shown in FIG. 3.

The reproduced frame address detecting circuit 6 derives a signal FRNG (FIG. 9-6) which goes low when reproduced frame addresses are stably detected thereby. The signal FRNG is at a high level at the start or when the reproduced frame address cannot be detected. The signal FRNG is supplied to a pulse generator 41 which outputs a pulse PS when the signal FRNG goes down from the high level as shown in FIG. 9-7. In other words, the pulse PS is derived when the reproduced frame address can be stably detected and then it is supplied to one input terminal of an AND gate 42. The AND gate 42 is supplied at the other input terminal thereof with a start signal ST (FIG. 9-1) through a terminal 43. Therefore, the AND gate 42 delivers the output pulse PS when the signal FRNG goes to the low level and the reproduced frame address can be stably detected when the start signal ST goes to the high level to thereby start the reproduction. The output pulse PS is supplied to the load terminal of the counter forming the reference frame address generating circuit 10. The reference frame address generating circuit 10 is also supplied at its preset terminal with the reproduced frame address data (FIG. 9-3) from the reproduced frame address detecting circuit 6. Thus, the count value of the counter forming the reference frame address generating circuit 10 is preset to a reproduced frame address value at the time the reproduced frame address can be stably derived (refer to FIG. 9-2). It is therefore possible to suppress fluctuations in the servo operation and thereby set the apparatus into the operating condition in a short time period.

The signal FRNG from the reproduced frame address detecting circuit 6 is further supplied to the selectors 14 and 36 as their selection control signal. In the normal condition, that is, when the signal FRNG is at the low level, the selector 14 selects the output from the latch circuit 12 and the selector 36 selects the output from the selector 32.

These selectors 14 and 36 are respectively supplied at their other input terminals thereof with the hexadecimal value "8H". Thus, at the start or when the reproduced frame address cannot be detected, that is, when the signal FRNG is at the high level, the selectors 14 and 36 respectively output a digital signal indicative of "8H" in hexadecimal. Accordingly, the comparator circuits 15 and 37 respectively deliver the signals $CM_1$ and $CM_2$, each with a duty ratio of 50%, to the motor 20 through the low pass filters 17 and 39.

In the above described manner, at the start or when the reproduced frame address cannot be detected, the output signals $CM_1$ and $CM_2$ respectively from the comparator circuits 15 and 37 are chosen to be a reference signal with a duty ratio of 50%, or 8:8 whereby the above-mentioned servo system is inoperative until the tape transporting speed becomes stable. Thereafter, when the reproduced frame address is stably detected and the signal FRNG goes to the low level, the aforementioned servo circuit operates to immediately enable the reproduction mode. Thus, unlike the case where the servo circuit is connected to the motor even at the start or when the reproduced frame address cannot be detected, the circuit arrangement according to the present invention can remove defective conditions such as when the rotational speed of the motor varies largely, bad circulation occurs, and consequently the unreproduceable condition continues for a long time, so that reproduction can be immediately started.

Whilst the above embodiment has been described in relation to an R-DAT by way of example, the present invention can be applied to all apparatus which reproduce PCM signals from a recording medium on which frame address signals together with block address signals, which are added to block data, are recorded at a unit of one track or a plurality of tracks.

The above description is given for a single preferred embodiment of the invention but it will be apparent that many modifications and variations could be effected by one skilled in the art without departing from the spirit or scope of the novel concepts of the invention so that the scope of the invention should be determined by the appended claims only.

We claim as our invention

1. Apparatus for reproducing digital signals which are recorded in one or more oblique tracks on a tape by rotary heads, the digital signals being formatted so that one frame is formed of a plurality of data blocks, each data block including a frame address which varies with every frame, said apparatus comprising:
   (a) rotary heads for reproducing digital signals from the tape;
   (b) means for transporting the tape relative to the rotary heads;
   (c) deriving means for deriving the frame address from the digital signals reproduced by the rotary heads;
   (d) generating means for generating a reference frame address which varies at a predetermined period;
   (e) comparing means for comparing the derived frame address with the reference frame address and generating a control signal; and
   (f) control means for controlling the tape speed of the tape transporting means in response to the control signal.

2. Apparatus for reproducing digital signals according to claim 1, wherein the generating means adds a predetermined offset to the reference frame address and further comprising offset reducing means for reducing said offset by comparing the output signal from said comparing means with a reference value and biasing said control means in response to the comparison result.

3. Apparatus for reproducing digital signals according to claim 1, wherein said deriving means comprises detection signal generating means for generating a detection signal indicating that a frame address is not detected, and wherein said comparing means is responsive to said detection signal to set said control signal to a predetermined value when the frame address is not detected.

4. Apparatus for reproducing digital signals according to claim 1 further comprising preset means for presetting the reproduced frame address to said reference frame address when said apparatus is started.

5. Apparatus for reproducing digital signals according to claim 3 further comprising preset means for presetting the reproduced frame address to said reference frame address when a frame address is first detected after the condition that the frame address could not be detected.

* * * * *